United States Patent [19]

Bailey et al.

[11] 4,417,020

[45] Nov. 22, 1983

[54] PIPE COMPOSITIONS CONTAINING ANISOTROPIC MELT-FORMING POLYMERS

[75] Inventors: Derrick S. Bailey, Welwyn; Brian P. Griffin, St. Albans, both of England

[73] Assignee: Imperial Chemical Industries PLC, London, England

[21] Appl. No.: 317,854

[22] Filed: Nov. 3, 1981

[30] Foreign Application Priority Data

Nov. 7, 1980 [GB] United Kingdom ................ 8035800

[51] Int. Cl.$^3$ ...................... C08L 27/18; C08L 61/00; C08L 67/04
[52] U.S. Cl. .................................... 524/502; 524/513; 524/514; 525/151; 525/153; 525/160; 525/165; 525/178
[58] Field of Search ............... 525/151, 153, 160, 165, 525/178; 524/502, 513, 514

[56] References Cited

U.S. PATENT DOCUMENTS

| | | | |
|---|---|---|---|
| 3,005,795 | 10/1961 | Busse et al. | 525/151 |
| 3,391,221 | 7/1968 | Gore et al. | 525/178 |
| 3,644,593 | 2/1972 | Nowak et al. | 525/151 |
| 3,991,013 | 11/1976 | Pletcher | 264/176 F |
| 4,243,574 | 1/1981 | Manwiller | 525/178 |

FOREIGN PATENT DOCUMENTS 50-34051  4/1975  Japan ................................ 525/151

*Primary Examiner*—Wilbert J. Briggs, Sr.
*Attorney, Agent, or Firm*—Cushman, Darby & Cushman

[57] ABSTRACT

Compositions containing a polymer of PTFE and a polymer capable of exhibiting an anisotropic melt characterized in that the compositions contain between 0.05 and 99.5% of PTFE and 0.5 to 99.95% by weight of the polymer capable of forming an anisotropic melt. The presence of a minor amount of the anisotropic melt-forming polymer, that is, from 0.5 to 50% by weight of the composition enables the processability of PTFE to be improved, even to the extent of providing an injection mouldable PTFE composition. Compositions containing 20 to 50% by weight of PTFE confer benefits on anisotropic melt-forming polymers, such as lubricity and greater versatility in fabrication operations. Concentration of 0.05 to 5.0% by weight of PTFE are particularly suitable for modifying the viscosity characteristics of the low melt viscosity anisotropic melt-forming polymers so that such anisotropic melt polymers are less subject to problems such as flashing and jetting during moulding.

9 Claims, No Drawings

PIPE COMPOSITIONS CONTAINING ANISOTROPIC MELT-FORMING POLYMERS

This invention relates to a composition formed from a blend of a tetrafluoroethylene polymer and a polymer capable of forming an anisotropic melt.

Tetrafluoroethylene polymers, that is homopolymers of tetrafluoroethylene or copolymers containing up to 5% by weight of other fluorinated comonomers, hereinafter termed PTFE, cannot readily be melt-processed by conventional techniques such as injection moulding. Although the homopolymer has a melting point at about 330° C. the mobility of the melt up to temperatures of 400° C. is so low that the polymer cannot be caused to flow into a mould under normal conditions. Although shaped articles of PTFE can be fabricated by techniques involving forming PTFE powders into shaped articles prior to sintering to fuse adjoining particles together such processes do not have the productivity of conventional melt-processing techniques. Improvements in the processability of PTFE have now been obtained by the use of PTFE compositions containing a minor proportion of polymers which are capable of forming anisotropic melts.

Compositions of anisotropic melt-forming polymers and PTFE in which the PTFE is present as the minor proportion also show advantages for different reasons. Thus whilst polymer melts in anisotropic form may be very mobile and readily injected into moulds the low viscosity may in some circumstances be a disadvantage. The presence of minor amounts of PTFE can be used to enhance the melt viscosity characteristics of the anisotropic melt.

Accordingly, there is provided a composition formed from a blend of a polymer of PTFE and a polymer capable of exhibiting an anisotropic melt characterized in that the composition contains between 0.05 and 99.5% by weight of PTFE and 0.5 to 99.95% by weight of the polymer capable of forming an anisotropic melt.

The PTFE may be in any of the forms in which it is normally available. Thus it may be of the type formed in a granular polymerisation which has subsequently been disintegrated and densified to a free-flowing powder. Alternatively it may be of the type prepared in the presence of an aqueous emulsifier solution which gives rise to a dispersion of polymer particles between about 0.05 micron and 0.5 micron in diameter which can subsequently be coagulated and compacted into particles between about 300 and 700 micron in diameter. When used in compositions containing small quantities of PTFE the latter type of dispersion polymer may be added to the anisotropic melt-forming polymer in the form of an aqueous dispersion, prior to coagulation, provided that the presence of water does not adversely effect the properties of the anisotropic melt-forming polymer.

A further form of PTFE which may be used to advantage is the low molecular weight form of PTFE formed by degradation of the granular or dispersion types. Such degradation may be brought about by heating in the presence of a polymer degradant such as potassium nitrate, or by irradiation with γ-rays.

The polymers capable of forming an anisotropic melt which are suitable for use in the invention are substantially linear polymers in which are incorporated sequences of rigid units or linear vinyl polymers having pendant groups which are sufficiently stiff to give an anisotropic melt. Preferably the polymer should be capable of exhibiting an anisotropic melt at temperatures in excess of the melting point of the PTFE (327° C. in the case of PTFE homopolymer) and desirably should be thermally stable at temperatures which enable the PTFE to be sintered, that is, desirably up to 380° C. However, this is not an essential requirement of the invention and useful compositions can be obtained by blending PTFE and an anisotropic melt-forming polymer at temperatures below the melting point of PTFE. The melting temperature and thermal stability of the anisotropic melt-forming polymer should not be so low as to detract appreciably from the excellent high temperature performance of PTFE.

Suitable polymers are disclosed, for example, in British patent specification No. 1,507,207 and U.S. Pat. No. 3,778,410. Polyazomethines which are capable of forming an anisotropic melt are described in U.S. Pat. No. 4,048,148. Polyesteramides which are capable of forming anisotropic melts are disclosed in European Patent Application No. 79391276.

Polyesters having pendant mesogenic vinyl groups are described in German patent application No. 27 22 589.

A method for determining whether a polymer gives anisotropic melt is described in British patent specification No. 1 507 207.

The advantages arising from the compositions of the invention are dependent on the relative proportions of PTFE and the polymer capable of forming the anisotropic melt. Compositions containing a major proportion of PTFE, i.e. at least 50% by weight of the composition, have a melt viscosity which is reduced in relation to the PTFE itself. The melt viscosity of the composition may be so reduced that the processability is improved to such an extent that conventional methods of fabricating the PTFE composition may be employed, such as injection moulding and conventional extrusion. Such compositions generally require at least 20% by weight of the composition of the anisotropic melt-forming polymer to bring about a sufficient reduction in processing temperature.

At the other end of the composition range the properties of anisotropic melt-forming polymers may be enhanced by the presence of small quantities of PTFE, particularly in the range 0.05 to 5.0% by weight of the total composition. For example, the low melt viscosity characteristics of such polymers may be favourably modified so that problems of flashing and jetting in the mould are reduced as is the high anisotropy normally exhibited by mouldings formed from anisotropic melts. Weld line strengths which are also often unacceptably low for easily orientated anisotropic melt-forming polymers can also be usefully improved by the addition of minor amounts of PTFE. Compositions containing intermediate concentrations of PTFE, for example in the range 20 to 50% PTFE by weight of the total composition may confer useful advantages such as lubricity in addition to providing compositions which have greater versatility in fabrication operations.

The compositions may be prepared by any of the conventional methods for blending materials. The most convenient methods involve forming a mixture at a temperature at which the anisotropic melt-forming polymer is exhibiting an anisotropic melt. This need not be at a temperature in excess of the melting point of the PTFE. On the other hand, further advantages may be obtained if the composition is formed at a temperature at which the PTFE is above its melting point. It is preferred that, if the blended composition contains a major proportion of PTFE and has been prepared at a temperature below the melting point of the PTFE, that the composition should be thermally stable if subjected to a temperature above the melting point of the PTFE. This enables a composition to be formed into a shaped article below the melting point of PTFE but to be subsequently sintered with the objective of improving the properties of the composition. This requirement is not essential to the invention and even in the case in which the composition is prepared and fabricated below the melting point of the PTFE, articles with very useful properties can be obtained.

The compositions of the invention may include a variety of materials conventionally present in moulding compositions. These include fillers of the reinforcing or non-reinforcing type, in both fibrous or particulate form which can be present at from 5 to 60% by weight of the composition. Typical fillers are glass fibres or metal powders. There may also be included pigments and other colourants, light and heat stabilisers, nucleants, mould release agents, plasticisers, fire-retardant additives and various other specific additives such as polymeric toughening agents.

The invention is further illustrated by reference to the following examples.

EXAMPLE 1

A composition containing 70% by weight of 'Fluon' G163 (a granular form of PTFE powder) and 30% by weight of a copolymer of chlorohydroquinone (0.5 mole), terephthalic acid (0.25 mole) and bis(p-carboxyphenoxy ethane) (0.25 mole) was prepared by the melt-blending procedure described below and evaluated for suitability for use in an injection moulding process.

The copolyester was prepared according to the procedure described in Example 3 of U.S. Pat. No. 3,991,013. The polymer had an intrinsic viscosity of 0.6 dl/g (measured at 25° C. on a 0.5% by weight solution in a 30:70 v/v mixture of trifluoroacetic acid:dichloromethane).

A dry blend of the copolyester and 'Fluon' G163 powders was tumbled for 5 minutes and then fed to a BussKo screw extrusion compounder (Modle PR46/11D). The blend was compounded at a nominal barrel temperature of 270° C. and the extruded product chopped into granule form. The compounds were injection moulded at a temperature of 270° C. on an Arburg All-Rounder 220 (IM22) injection moulding machine into tensile bar specimens and 110 mm diameter discs of 3 mm thickness. The compound moulded easily into injection moulded samples having a good surface finish. The tensile bar gave a tensile strength value of 47 MIN/m$^2$ and a flexural modulus of 5.9 GN/m$^2$. Flexural Modulus was measured on the discs at 0° and 90° to the direction of flow in the mould. Values of 4.5 and 2.5 GN/m$^2$ respectively were obtained indicating an anisotropy ratio of 1.8. Discs of the composition compared favourably in friction/wear properties with discs of PTFE alone.

By comparison a disc injection moulded from the copolyester alone showed an anisotropic ratio greater than 4:1. 'Fluon' G163 has such a high melt viscosity that it cannot be fabricated by injection moulding.

The composition was also formed into a 1.5 mm thick disc moulding. This was treated with oleum to extract the copolyester resin. A dense film of PTFE paper was left behind. This would have application for filtering corrosive liquids, electrolytic cell membranes and battery separators.

EXAMPLE 2

The effect of low concentrations of PTFE on the processing behaviour of an anisotropic melt-forming polymer was investigated using concentrations of 0.05 and 0.5% by weight of 'Fluon' CD123 (a high molecular weight coagulated PTFE dispersion powder) in the copolyester described in Example 1. The materials were dry blended and then compounded at a nominal melt temperature of 270° C. on a Betol extruder. Measurements were made of the melt viscosity at 270° C. and the die swell ratio of extrudate using a capillary rheometer with die 8 mm in length and 1.18 mm in diameter. The results are recorded in Table 1.

TABLE 1

| Sample | Viscosity at Shear stress of 10 N/m$^2$ | Die swell ratio at Shear stress of $4 \times 10^4$ N/m$^2$ |
|---|---|---|
| Copolyester + 0.5% by weight 'Fluon' CD123 | $7.5 \times 10^3$ | 1.28 |
| Copolyester + 0.05% by weight 'Fluon' CD123 | $2.6 \times 10^3$ | 0.97 |
| Copolyester alone | $2.3 \times 10^3$ | 0.95 |

The increasing die swell ratio indicates that greater control over injection moulding variables can be achieved and, in particular, that flashing and jetting in the mould can be reduced.

In further experiments in which the shear stress was varied it was noted that the die swell ratio decreased with increasing shear stress whereas the reverse is observed for conventional thermoplastic processing.

EXAMPLE 3

A series of compositions containing various types of PTFE and the copolyester described in Example 1 were prepared. The compositions, listed in Table 2, were blended on a Vickers Transfer Mix extruder. The melt temperatures recorded were measured by a digital thermometer probe in the die of the extruder. The extrudate quality and processability were assessed from the viscosity characteristics observed using a capilliary rheometer at a melt temperature of 270° C. These results are also recorded in Table 2.

TABLE 2

| Sample | Melt temperature during compounding | Shear stress at shear rate of 950 sec$^{-1}$ | Viscosity at shear rate of 950 sec$^{-1}$ | Extrudate quality | Processability |
|---|---|---|---|---|---|
| 80 polyester: 20 'Fluon' G163 | 320° C. | $1 \times 10^5$ | $1.06 \times 10^2$ | Smooth, showing die swell | Mouldable |
| 80 polyester: 20 'Fluon' G201 | 280–300° C. | $2.5 \times 10^4$ | 27 | Weak extrudate | Easily mouldable |

TABLE 2-continued

| Sample | Melt temperature during compounding | Shear stress at shear rate of 950 sec$^{-1}$ | Viscosity at shear rate of 950 sec$^{-1}$ | Extrudate quality | Processability |
|---|---|---|---|---|---|
| 80 polyester: 20 'Fluon' L171 | 280–300° C. | 2.1 × 10$^4$ | 22 | Extensible melt lace shows die swell | Easily mouldable |
| 80 polyester: 20 'Fluon' L169 | 280–300° C. | 2.7 × 10$^4$ | 23 | Smooth, brittle lace | Easily mouldable |
| 50 polyester: 50 'Fluon' L171 | 300° C. | 5.8 × 10$^4$ | 45 | Good quality | Easily mouldable |
| 50 polyester: 50 'Fluon' G201 | 300° C. | 4 × 10$^4$ | 35 | Extensible melt, brittle extrudate | Easily mouldable |

'Fluon' G163 is a granular PTFE.
'Fluon' G201 is a granular PTFE, presintered extrusion grade.
'Fluon' L171 is a lubricant grade of PTFE.
'Fluon' L169 is a lubricant grade of PTFE.

EXAMPLE 4

Blends of PTFE homopolymer ('Fluon' G163) and polyesters of 6-hydroxynaphthoic acid and p-hydroxybenzoic acid (as disclosed in U.S. Pat. No. 4,161,470) were prepared by dry blending the powders followed by compounding on a Brabender Plastograph compounding machine. The compositions and temperatures employed are given below together with the melt viscosities at 330° C. measured on milled samples of the compounded product using a melt flow grader and a very low shear rate (1 sec$^{-1}$).

TABLE 3

| Composition (% by weight) 'Fluon' G163:Polyester | Compounding temperature (°C.) | Melt viscosity (Ns/m$^2$) at shear stress of 3 × 10$^5$ N/m$^2$ |
|---|---|---|
| 70:30$^1$ | 295 | 5.6 × 10$^4$ |
| 70:30$^1$ | 330 | 5.6 × 10$^4$ |
| 70:30$^2$ | 280 | 1.2 × 10$^5$ |

$^1$The polymer used contained 6-hydroxynaphthoic acid and p-hydroxybenzoic acid in the molar ratio 70:30.
$^2$The polymer used contained 6-hydroxynaphthoic acid and p-hydroxybenzoic acid in the molar ratio 60:40.

The melt viscosity of 'Fluon' G163 is so high that it will not flow in the melt flow grader and no comparative data can be given.

EXAMPLE 5

The effect of including an anisotropic melt-forming polymer on the properties of PTFE compositions designed for bearing applications was examined in this example. The compositions listed below (Table 4) were extrusion compounded by dry blending the ingredients followed by compounding at a temperature of 280° C. on a small Betol extruder at a screw speed of 60 rpm. The product was extruded as a 1 mm diameter lace and cut into granules for moulding.

The granule product was injection moulded at 280° C. on an Arburg injection moulding machine fitted with a large barrel and an open nozzle into discs of diameter 114 mm and thickness 3 mm. The mould temperature was 40° C. and the injection speed and pressure were set to 90% of the maximum obtainable on the machine. The total cycle time was 42 seconds. The wear and friction properties on the discs were measured on an Amsler wear test machine. Each specimen was tested for 24 hours on an 80 mm diameter test wheel with a surface finish of 8 to 12 microinch CLA (centre line average).

TABLE 4

| Material proportions by weight | Speed 50 ft./min. Load 75 lb/in$^2$ | | | Speed 200 ft./min. Load 75 lb/in$^2$ | | |
|---|---|---|---|---|---|---|
| | Initial Friction | Final Friction | Wt. loss (g) | Initial Friction | Final Friction | Wt. loss (g) |
| 70 'Fluon' VB60$^1$: 30 Polyester$^2$ | 0.125 | 0.15 | 0.0022 | 0.2 | 0.15 | 0 |
| 70 'Fluon' VR15$^3$: 30 Polyester$^2$ | 0.1 | 0.15 | 0.003 | 0.15 | 0.2 | 0.0024 |
| 28 'Fluon' L169$^4$: 42 Bronze$^5$: 30 Polyester$^2$ | 0.1 | 0.1 | 0.0022 | 0.15 | 0.15 | 0 |

$^1$'Fluon' VB60 is available from ICI and is a 60% bronze/40% unsintered PTFE composition.
$^2$The polyester used is that described in Example 1.
$^3$'Fluon' VR15 is available from ICI and is a 15% graphite/85% presintered PTFE composition.
$^4$'Fluon' L169 is available from ICI and is a low molecular weight lubricant grade of PTFE.
$^5$The bronze used was a powdered metallurgy bronze as used in 'Fluon' VB60.

The results obtained compare favourably with conventional PTFE compositions used in bearings. The compositions have the added advantage that they permit a much greater freedom in fabrication procedures to produce finished bearings than do normal PTFE compositions.

We claim:

1. A composition formed from a blend of a polymer of PTFE and a polymer capable of exhibiting an anisotropic melt characterised in that the composition contains between 20 and 99.5% by weight of PTFE and 0.5 to 80% by weight of the polymer capable of forming an anisotropic melt.

2. A composition according to claim 1 wherein the composition contains from 50 to 80% by weight of the composition of PTFE.

3. A composition according to either of claims 1 and 2 wherein the composition contains from 5 to 60% by weight of the composition of a reinforcing and/or a non-reinforcing filler, the percentages of ingredients in the composition totalling 100%.

4. A composition according to any one of claims 1 to 3 in which the polymer which is capable of forming an anisotropic melt is capable of forming such a melt over a range which includes the temperature at which the PTFE can be melted.

5. A composition according to any one of claims 1 to 4 in which the polymer capable of forming an anisotropic melt is not capable of forming an anisotropic melt above the melt temperature of the PTFE.

6. A method of producing a composition according to claim 5 comprising mixing a particulate PTFE and a polymer capable of forming an anisotropic melt at a mixing temperature of at least that of the melting point of the PTFE.

7. A method of producing a composition according to claim 6 comprising mixing a particulate PTFE and a polymer capable of forming an anisotropic melt at a mixing temperature below that of the melting temperature of the PTFE.

8. Shaped articles formed from a composition according to any one of claims 1 to 5.

9. A bearing surface formed from a composition according to any one of claims 1 to 5.

* * * * *